US011953582B2

(12) United States Patent
Kim et al.

(10) Patent No.: US 11,953,582 B2
(45) Date of Patent: Apr. 9, 2024

(54) DISTANCE MEASURING APPARATUS AND METHOD USING IMPULSE CORRELATION

(71) Applicant: INDUSTRY-ACADEMIC COOPERATION FOUNDATION, YONSEI UNIVERSITY, Seoul (KR)

(72) Inventors: Tae Wook Kim, Seoul (KR); Sung Young Lee, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 647 days.

(21) Appl. No.: 17/123,227

(22) Filed: Dec. 16, 2020

(65) Prior Publication Data

US 2021/0302559 A1 Sep. 30, 2021

(30) Foreign Application Priority Data

Mar. 31, 2020 (KR) ........................ 10-2020-0038714

(51) Int. Cl.
*G01S 13/34* (2006.01)
*G01S 7/288* (2006.01)
*G01S 13/10* (2006.01)
*G01S 13/50* (2006.01)
*G04F 10/00* (2006.01)

(52) U.S. Cl.
CPC ............ *G01S 13/346* (2013.01); *G01S 13/10* (2013.01); *G01S 13/50* (2013.01); *G04F 10/005* (2013.01); *G01S 7/2886* (2021.05)

(58) Field of Classification Search
CPC ....... G01S 17/10; G01S 7/4865; G04F 10/005
See application file for complete search history.

(56) References Cited

U.S. PATENT DOCUMENTS

| 5,179,286 | A | * | 1/1993 | Akasu | ..................... G01S 17/10 |
| | | | | | 250/559.38 |
| 2002/0093640 | A1 | * | 7/2002 | Watanabe | ............. G01S 13/325 |
| | | | | | 356/5.01 |

(Continued)

FOREIGN PATENT DOCUMENTS

| KR | 10-2007-0054664 A | 5/2007 |
| KR | 10-2018-0070987 A | 6/2018 |
| KR | 10-2019-0089292 A | 7/2019 |

*Primary Examiner* — Jermele M Hollington
*Assistant Examiner* — Temilade S Rhodes-Vivour (57) ABSTRACT

A distance measuring apparatus includes: a DTC generator unit that generates DTC signals having edges delayed to define time segments; a template generator unit that generates template signals consecutively in a pre-designated number within the time segments in response to the DTC signals; a coarse time determiner unit that determines the time segment in which a delayed signal is received by calculating correlations with the consecutively generated template signals; a fine time measurer unit that determines the time at which the delayed signal is received within the time segment determined at the coarse time determiner unit from the results of calculating correlations between multiple template signals within the determined time segment and the delayed signal; and a distance calculator unit that calculates the total delay duration of the delayed signal and calculates the distance to the measurement target object from the calculated delay duration.

12 Claims, 11 Drawing Sheets

(56) References Cited

U.S. PATENT DOCUMENTS

| | | | |
|---|---|---|---|
| 2013/0176158 A1* | 7/2013 | Kim | G01S 13/10 |
| | | | 341/166 |
| 2015/0177369 A1* | 6/2015 | Kostamovaara | G01C 3/08 |
| | | | 250/214.1 |
| 2017/0030996 A1* | 2/2017 | Fireaizen | G01S 5/06 |

* cited by examiner

DISTANCE MEASURING APPARATUS AND METHOD USING IMPULSE CORRELATION

CROSS-REFERENCE TO RELATED APPLICATIONS

The present application claims priority under 35 U.S.C. § 119(a) to Korean Patent Application No. 10-2020-0038714, filed with the Korean Intellectual Property Office on Mar. 31, 2020, the disclosure of which is incorporated herein by reference in its entirety.

BACKGROUND

1. Technical Field

The present disclosure relates to an apparatus and a method for measuring distance, more particularly to a distance measuring apparatus and method using impulse correlation.

2. Description of the Related Art

Current radars that use impulse signals for distance measurement utilize a method of envelope detection. However, such envelope detection method may be limited in terms of the signal-to-noise ratio, as there is difficulty in differentiating internal and external noise from the impulse signals that should be measured. Moreover, in order to provide a high resolution or identify the positions of objects that are at a far distance away, the number of bits used for digital-to-time conversion (DTC) may have to be correspondingly greater.

SUMMARY

An objective of the invention is to provide a distance measuring apparatus and method that can accurately measure the position of an object at a far distance at a higher resolution compared to existing techniques.

Another objective of the invention is to provide a distance measuring apparatus and method that can reduce the number of bits associated with DTC.

A distance measuring apparatus according to an embodiment of the disclosure, conceived to achieve the objectives above, may include: a DTC generator unit configured to generate digital-to-time conversion (hereinafter abbreviated as DTC) signals that have edges delayed to define time segments in units of a pre-designated time interval from a starting time point at which an impulse signal is emitted; a template generator unit configured to generate template signals consecutively in a pre-designated number within the time segments in response to the DTC signals, where the template signals have the same waveform as the impulse signal; a coarse time determiner unit configured to determine the time segment in which a delayed signal is received by calculating correlations with the consecutively generated template signals, when the delayed signal is received after a delay as the emitted impulse signal is reflected off an object; a fine time measurer unit configured to determine the time at which the delayed signal is received within the time segment determined at the coarse time determiner unit from the results of calculating correlations between a multiple number of template signals within the determined time segment and the delayed signal; and a distance calculator unit configured to calculate the total delay duration of the delayed signal from the determined time segment and the time at which the delayed signal is received within the time segment and calculate the distance to the measurement target object from the calculated delay duration.

The coarse time determiner unit can calculate correlations between the multiple template signals generated consecutively in each defined time segment and the delayed signal and can determine the time segment for which the calculated correlation values are greater than or equal to a pre-designated threshold value.

The fine time measurer unit can determine the time at which the delayed signal is received by applying I/Q modulation to each of the multiple template signals within the determined time segment to obtain a multiple number of I template signals and a multiple number of Q template signals and calculating the correlations between the multiple I template signals and multiple Q template signals and the delayed signal.

The fine time measurer unit can determine the correlations between the multiple template signals and the delayed signal based on I/Q vectors formed as combinations of I data and Q data corresponding to each other from among multiple pieces of I data and multiple pieces of Q data and can determine the time at which the delayed signal is received from the determined correlations, where the multiple pieces of I data can be obtained by calculating correlations between the multiple I template signals and the delayed signal, and the multiple pieces of Q data can be obtained by calculating correlations between the multiple Q template signals and the delayed signal.

The fine time measurer unit can divide the determined time segment into a multiple number of time sub-segments and can calculate the correlations between the multiple I template signals and multiple Q template signals and the delayed signal at the level of each time sub-segment.

The DTC generator unit can define the time segments in units of a time interval corresponding to the period of a template signal and the number of template signals generated consecutively.

The DTC generator unit can generate DTC signals having edges delayed by durations corresponding to the values of DTC codes received from the outside in units of the time interval from the starting time point.

The distance measuring apparatus can further include an impulse transmitter unit that is configured to generate the impulse signal of a pre-designated waveform, where the impulse transmitter unit can be configured to emit the generated impulse signal upon receiving a clock signal having an edge designating the starting time point.

A distance measuring method according to another embodiment of the disclosure, conceived to achieve the objectives above, may include: generating digital-to-time conversion (hereinafter abbreviated as DTC) signals, where the DTC signals may have edges delayed to define time segments in units of a pre-designated time interval from a starting time point at which an impulse signal is emitted; generating template signals consecutively in a pre-designated number within the time segments in response to the DTC signals, where the template signals have the same waveform as the impulse signal; determining a time segment in which a delayed signal is received by calculating correlations with the consecutively generated template signals, when the delayed signal is received after a delay as the emitted impulse signal is reflected off an object; determining a time at which the delayed signal is received within the determined time segment from the results of calculating correlations between a multiple number of template signals within the determined time segment and the delayed signal;

and calculating the total delay duration of the delayed signal from the determined time segment and the time at which the delayed signal is received within the time segment and calculating the distance to the measurement target object from the calculated delay duration.

A distance measuring apparatus and method according to certain embodiments of the disclosure can thus define time segments including template signals that are a pre-designated number of consecutive and repeated duplicates of the impulse signal and detect the time difference between a template signal and the received signal within the time segment associated with the detection of the received signal, which is received as the impulse signal is reflected off an object, based on correlations between the template signals and the received signal, so as to not only increase the measurable distance without an increase in the number of bits for DTC but also allow a measurement of an object's position with higher precision. The number of bits for DTC can also be reduced.

Additional aspects and advantages of the present invention will be set forth in part in the description which follows, and in part will be obvious from the description, or may be learned by practice of the invention.

DETAILED DESCRIPTION

To sufficiently understand the present invention, its advantages, and the objectives achieved by practice of the invention, it is necessary to refer to the appended drawings that illustrate preferred embodiments of the disclosure as well as the descriptions provided for the appended drawings.

The present disclosure is described in detail below, through a description of preferred embodiments of the disclosure with reference to the accompanying drawings. However, the invention can be implemented in various different forms and is not limited to the described embodiments. For a clearer understanding of the invention, parts that are not of great relevance to the invention have been omitted, and like reference numerals in the drawings are used to represent like elements.

Throughout the specification, reference to a part "including" or "comprising" an element does not preclude the existence of one or more other elements and can mean other elements are further included, unless there is specific mention to the contrary. Also, terms such as "unit", "device", "module", "block", etc., refer to units for processing at least one function or operation, where such units can be implemented as hardware, software, or a combination of hardware and software.

Figure 1:
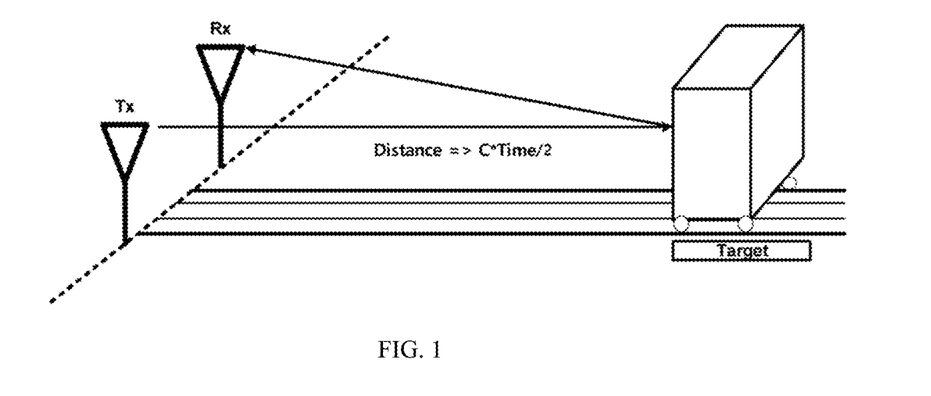
FIG. 1 and FIG. 2 are diagrams conceptually illustrating how a distance to an object may be measured by using impulse signals.
Figure 2:
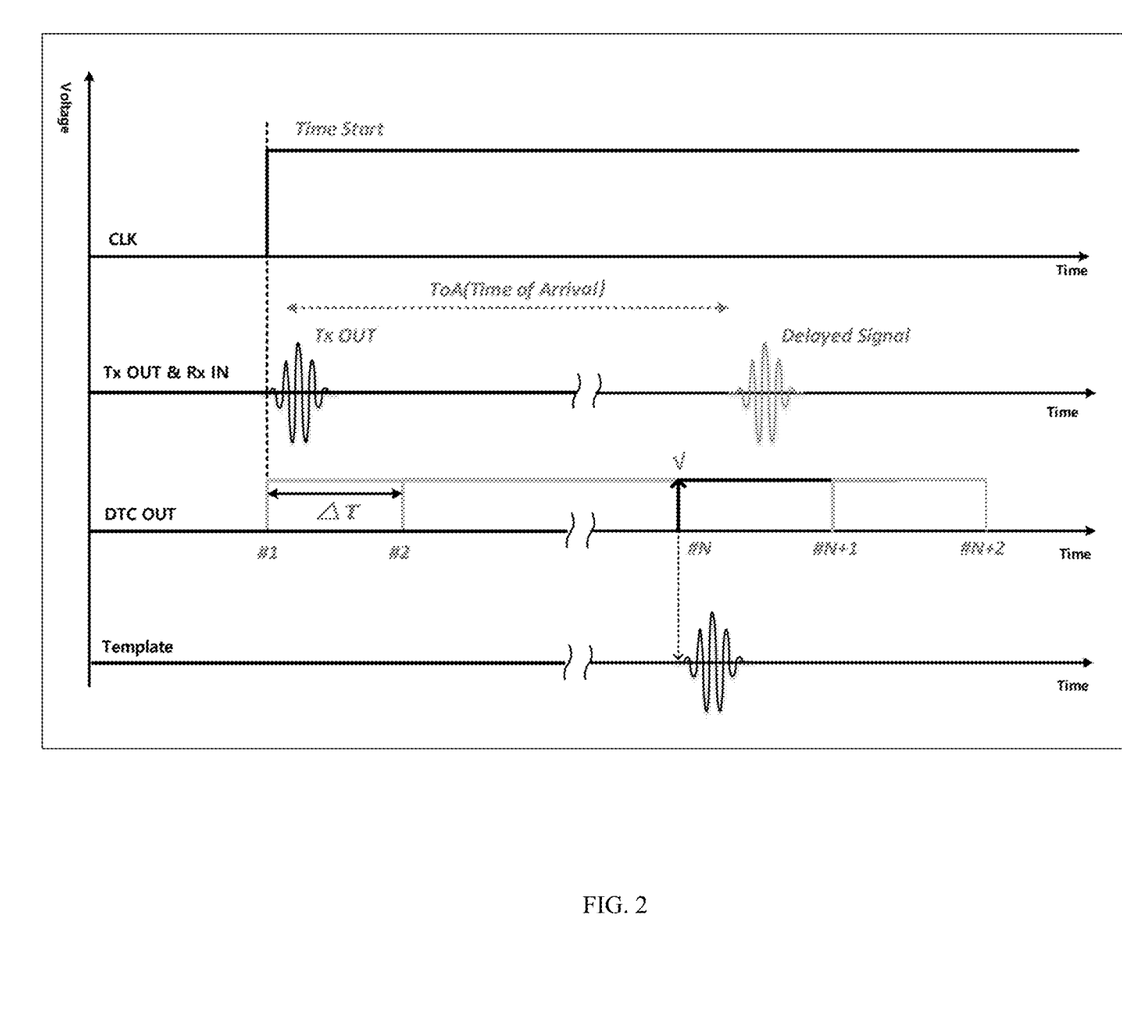

FIG. 1 and FIG. 2 are diagrams conceptually illustrating how a distance to an object may be measured by using impulse signals.

As illustrated in FIG. 1, a method of measuring the distance to an object by using impulse signals may involve emitting a signal of a pre-designated impulse pattern, measuring the time until the emitted impulse signal is reflected off an object and received after a delay as a reception signal, and measuring the distance to the object by converting the measured time difference into a distance. Here, since the impulse signal is received after traveling to the object and back, the distance to the object can be calculated as C*T/2 (where C is the speed of light, and T is the time passed from the emission of the impulse signal to the receiving of the reception signal). As such, the distance measurement requires a precise measurement of the time passed until the reception signal is received, and such measurement of time requires an accurate detection of the reception signal.

As illustrated in FIG. 2, a distance measuring apparatus may emit an impulse signal in a pre-designated waveform through an antenna in sync with a rising edge (or falling edge) of a clock signal CLK. Here, the clock signal CLK is not a regular clock signal but rather a signal wherein a rising edge (or falling edge) is generated such that the impulse signal may be emitted at a pre-designated time point, and the time point at which the rising edge (or falling edge) is generated may be referred to as the starting time point (Time Start). The emitted impulse signal can be generated as a digital signal and converted to an analog signal, to be emitted as an impulse signal of an analog form as in FIG. 2. The impulse signal emitted as the transmission signal Tx may reach and be reflected off the object, and a delay signal DS delayed by a duration ending at the time of arrival may be received at the antenna as the reception signal.

The distance measuring apparatus may measure the distance of the object by measuring the delay of the received delayed signal DS from the starting time point (Time Start) at which the impulse signal was emitted. To do so, the distance measuring apparatus, in response to digital code values received from the outside, may generate DTC signals in which the rising edges (or falling edges) are generated with delays corresponding to the digital-to-time conversion (hereinafter abbreviated as DTC) codes, which are the received digital code values, from the starting time point (Time Start). Here, the DTC signals can be generated with delays of pre-designated time intervals $\Delta\tau$ according to the values of the DTC codes (#1, #2, ..., #N+2), as illustrated in FIG. 2. With respect to the rising edge of a generated DTC signal, a template signal may be generated that has the same waveform as the impulse signal emitted as the transmission signal Tx. That is, the template signal can be generated with a delay that is variable in units of the time interval $\Delta\tau$ according to the digital code value.

In FIG. 2, the relative position where the template signal is generated with respect to the rising edge of the clock signal CLK can be expressed as Equation 1 below.

Relative position of Template=CLK Rising Edge+ ($\Delta\tau$*#N)     [Equation 1]

N=Timing selected by DTC code

As the template signal is generated in response to a DTC code, by determining relative duration information between the delayed signal DS and the template signal, i.e. by determining the time difference, it is possible to compute the distance of the object based on the generated time of the template signal and the relative duration information. The relative duration information between the delayed signal DS and the template signal can be obtained from the correlation between the delayed signal DS and the template signal.

In the case of an existing distance measuring apparatus, the time interval $\Delta\tau$ may be set such that a template signal is generated according to a DTC code. Thus, the range in which a template signal can be positioned may represent the measurable distance of the distance measuring apparatus. This is because the template signal serves as a reference point required for measuring distance. Also, since the position of the template signal may be determined by a DTC code, if the number of bits of the DTC codes is increased, the position of the template signal can be adjusted up to a correspondingly broader range. Furthermore, increasing the resolution of the DTC codes allows more finely positioning the template signal, but the measurable distance would be decreased for the same number of bits. That is, increasing the number of bits of the DTC codes can make it possible to measure greater distances but may correspondingly increase the size of the DTC code generation circuit and lower the efficiency of the circuit. Also, increasing the resolution of the DTC codes can allow fine movements of position but may result in a shorter measurable distance for the same number of bits.

This embodiment performs a two-step distance measurement that enables a finer measurement of the position of an object up to a greater distance with no increase, or even a decrease, in the number of bits of the DTC codes. A distance measuring apparatus according to this embodiment, in a first step, may set the time interval $\Delta\tau$ such that a multiple number of pre-designated template signals are generated for the respective values of the DTC codes to thereby coarsely determine the time segment in which the delayed signal DS is received. Then, by using the correlation between the multiple template signals and the delayed signal DS at the determined coarse position of the object to obtain the relative duration information between the delayed signal and a template signal, the distance measuring apparatus may determine the exact delay duration of the received delayed signal DS and, based on the determined delay duration, calculate the distance of the object.

In other words, it is possible to more finely measure the position of an object up to a greater distance with no increase in, or even with a decrease in, the number of bits of the DTC codes.

Figure 3:
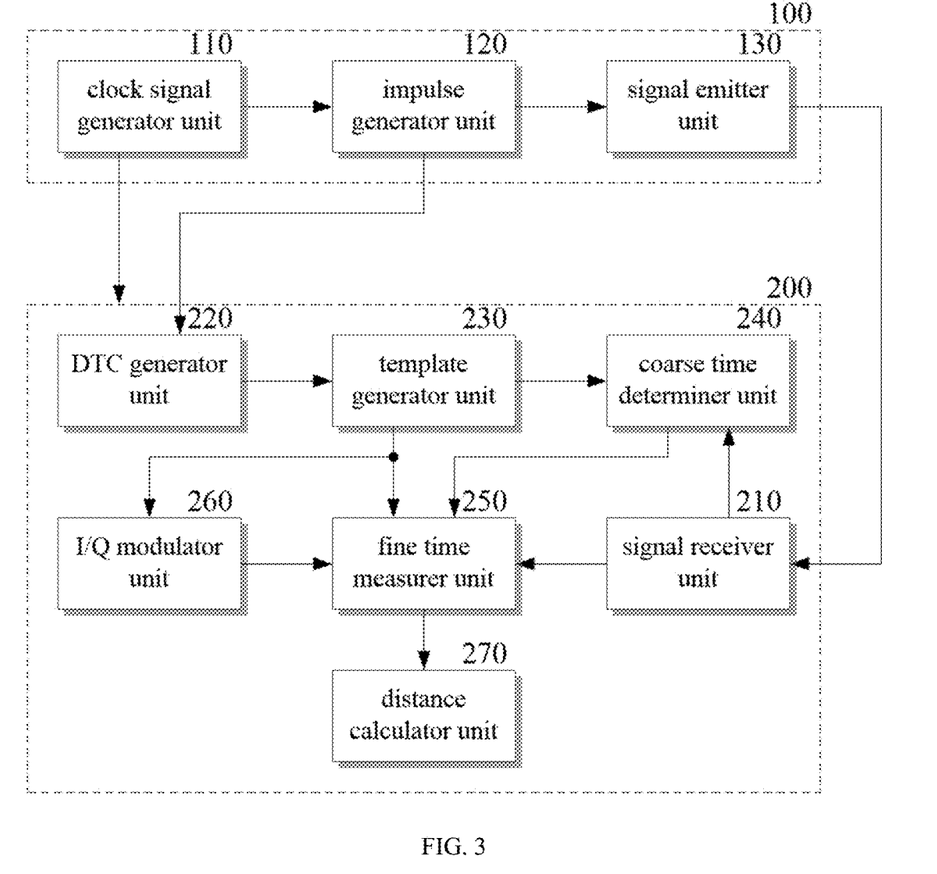
FIG. 3 schematically illustrates a structure of a distance measuring apparatus according to an embodiment of the disclosure.
Figure 4:
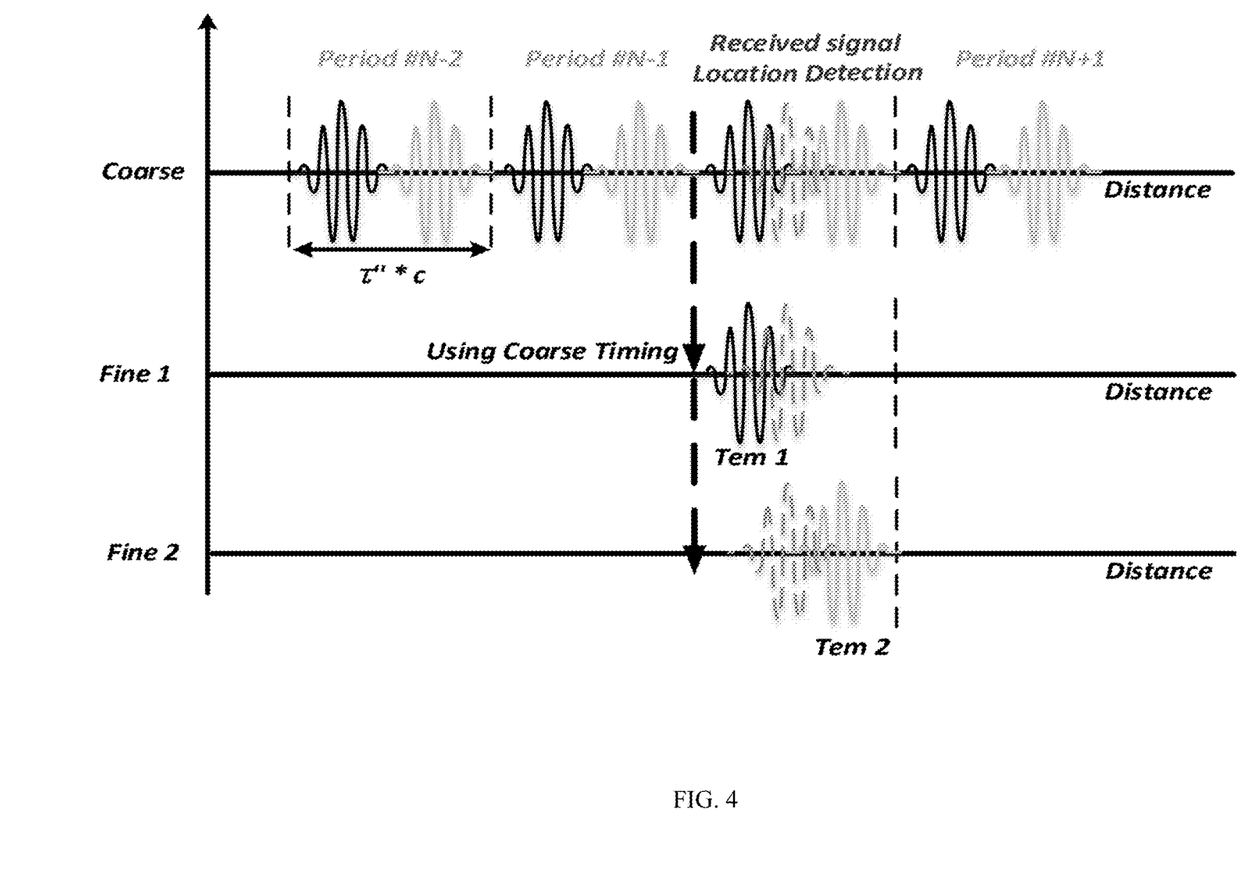
FIG. 4 is a diagram conceptually illustrating how the coarse time determiner unit and the fine time measurer unit of FIG. 3 may detect the position of an object by using template signals.
Figure 5:
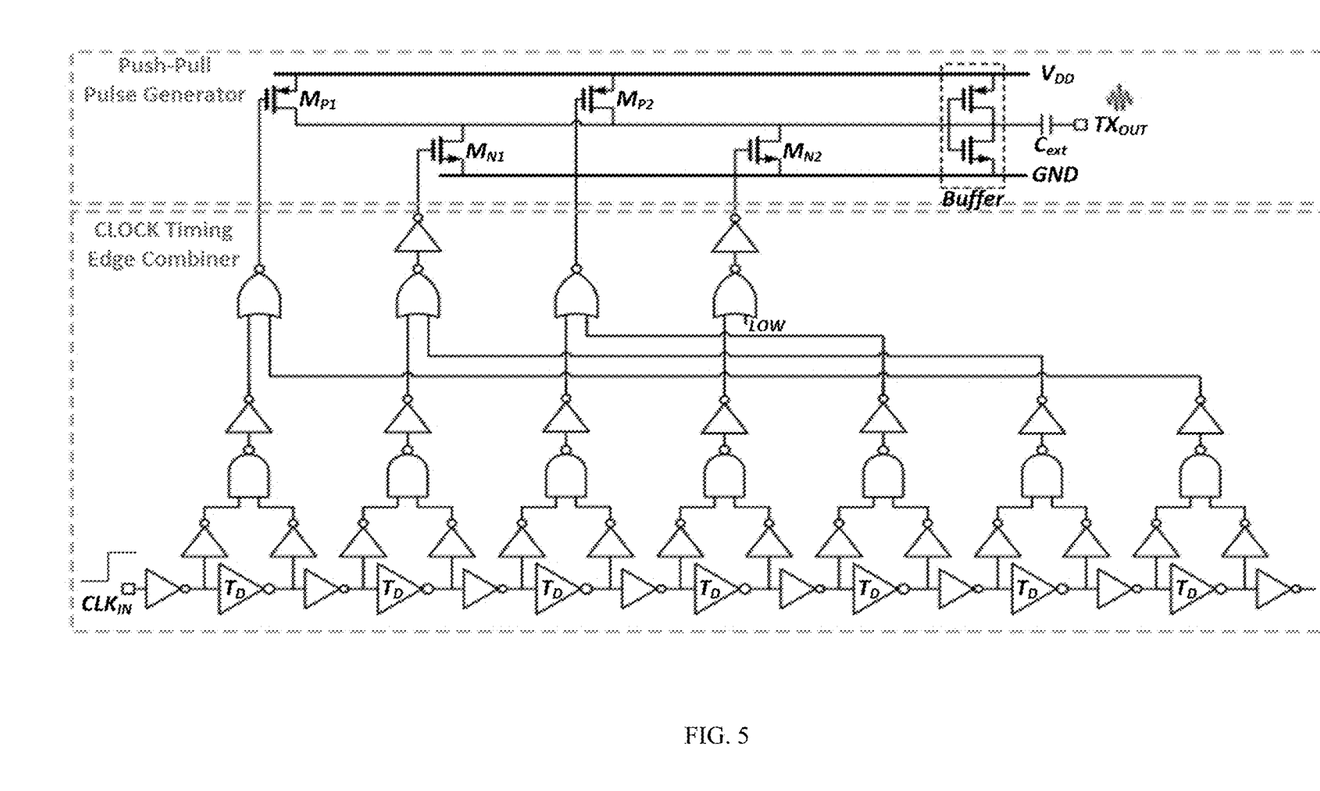
FIG. 5 and FIG. 6 illustrate example implementations of the template generator unit.
Figure 6:
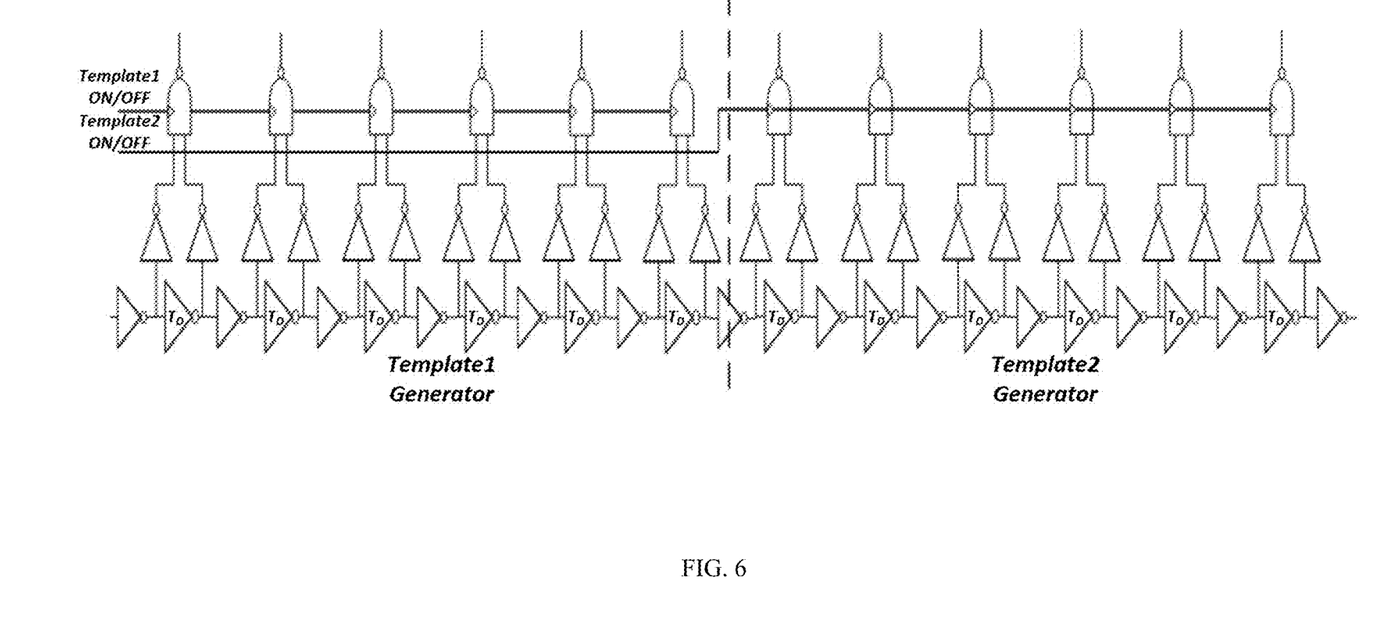
Figure 7:
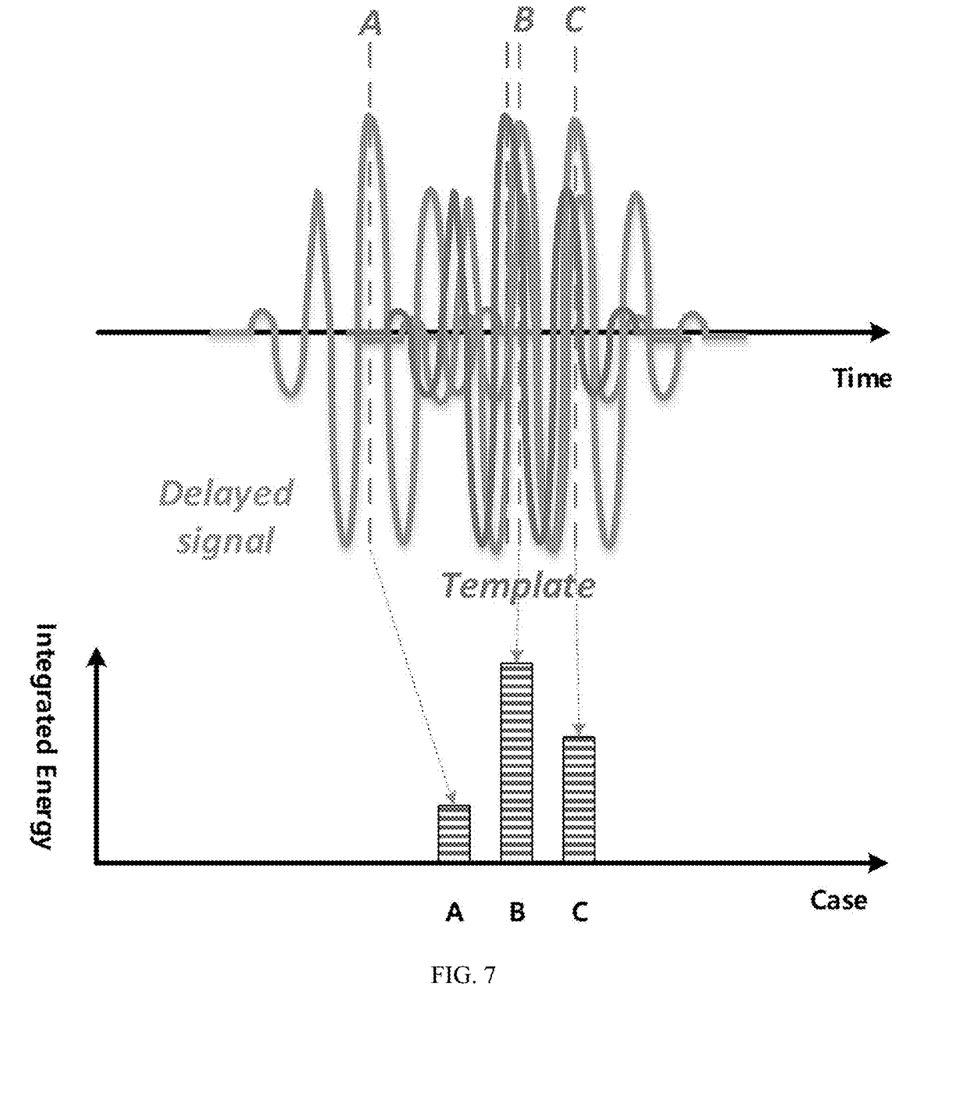
FIG. 7 and FIG. 8 illustrate the correlation between a reception signal and a template signal.
Figure 8:
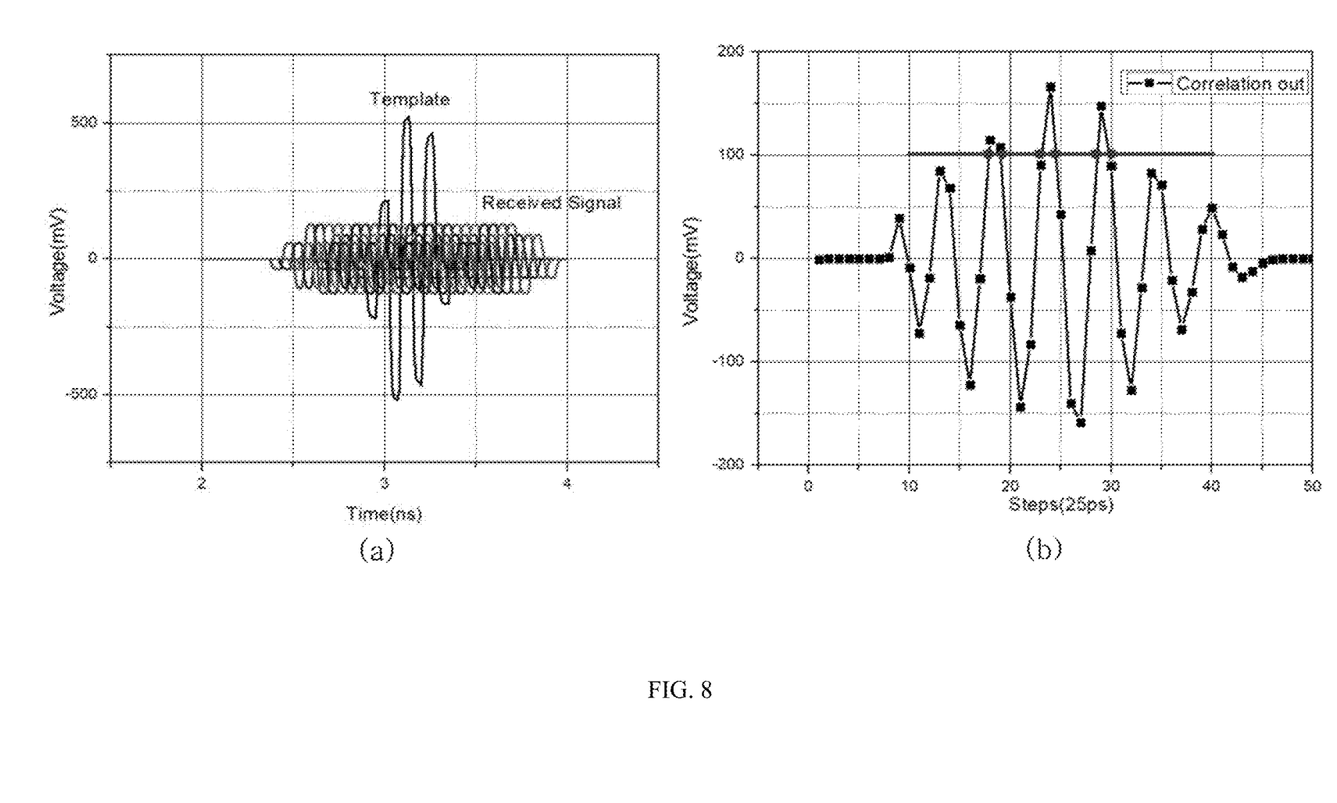
Figure 9:
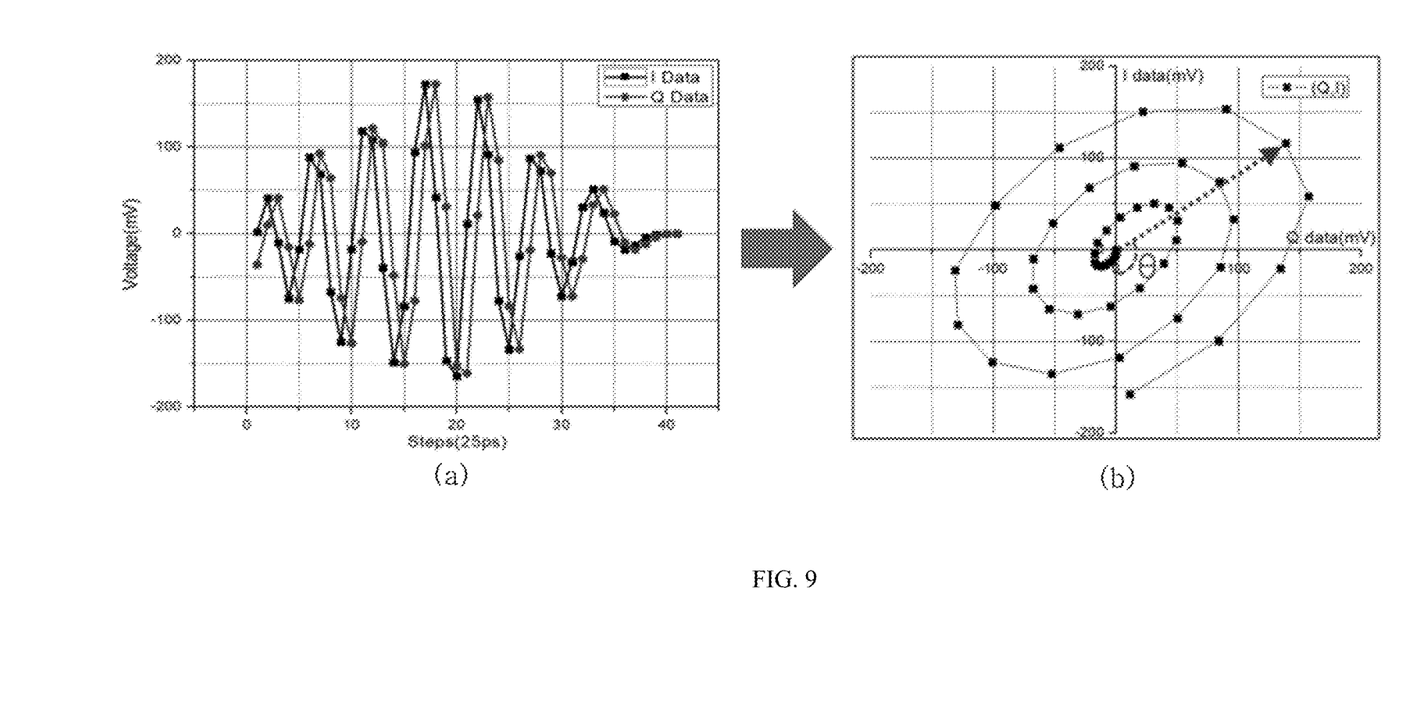
FIG. 9 illustrates the principle by which the fine time measurer unit detects the received time of a delayed signal by using I/Q data.
Figure 10:
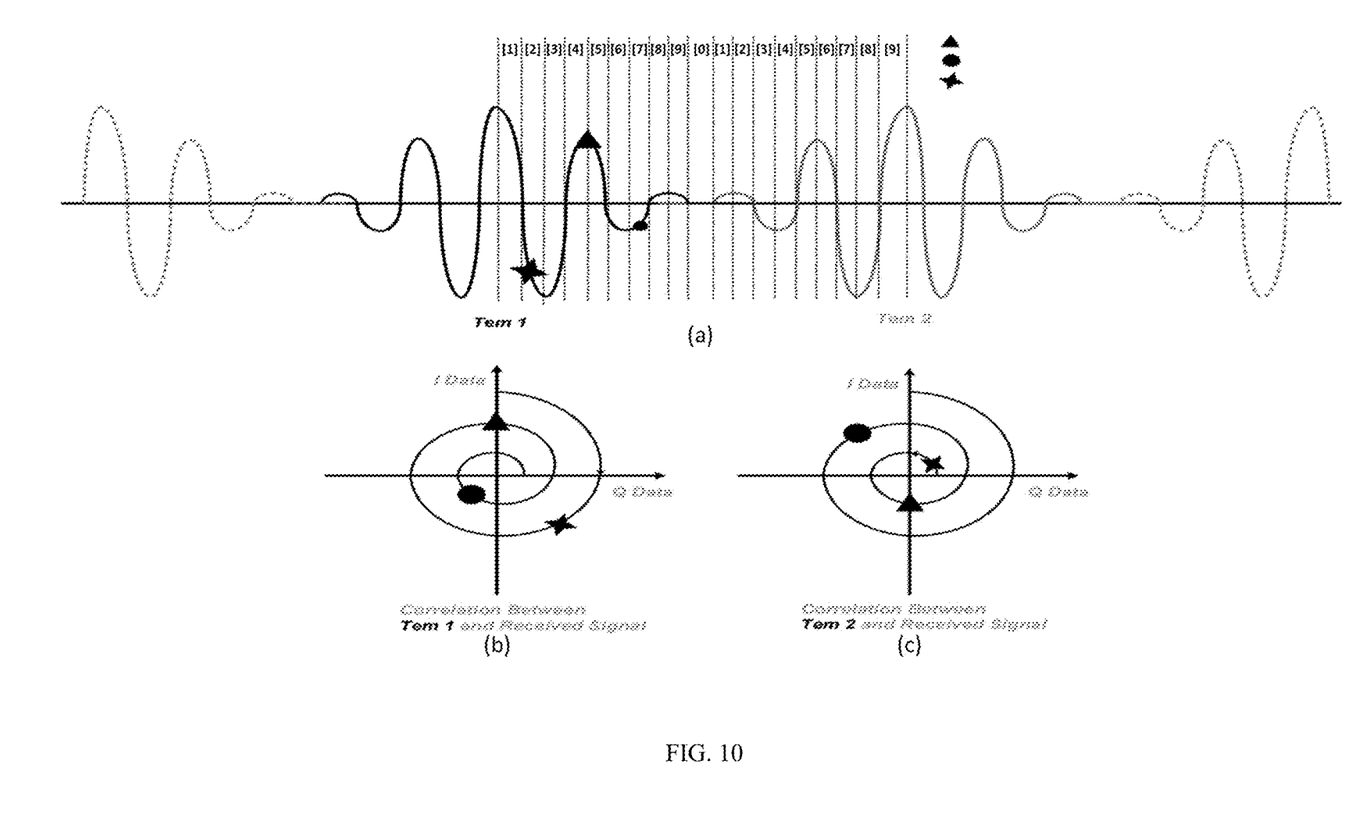
FIG. 10 illustrates the principle by which the fine time measurer unit detects the received time of a delayed signal by using a multiple number of consecutively generated template signals.

FIG. 3 schematically illustrates the structure of a distance measuring apparatus according to an embodiment of the disclosure, FIG. 4 is a diagram conceptually illustrating how the coarse time determiner unit and the fine time measurer unit of FIG. 3 may detect the position of an object by using template signals, and FIG. 5 and FIG. 6 illustrate example implementations of the template generator unit. FIG. 7 and FIG. 8 illustrate the correlation between a reception signal and a template signal, FIG. 9 illustrates the principle by which the fine time measurer unit detects the received time of a delayed signal by using I/Q data, and FIG. 10 illustrates the principle by which the fine time measurer unit detects the received time of a delayed signal by using a multiple number of consecutively generated template signals.

Referring to FIG. 3, a distance measuring apparatus according to this embodiment may include an impulse transmitter unit 100 that generates and emits impulse signals and a delay signal detector unit 200 that determines the distance of an object through a two-step measurement, i.e. a coarse measurement and a fine measurement, of the delay duration of the delayed signal DS, which is received after a delay after the emitted impulse signal is reflected off the object.

The impulse transmitter unit 100 can include a clock signal generator unit 110, an impulse generator unit 120, and a signal emitter unit 130. The clock signal generator unit 110 may generate and output the clock signal CLK illustrated in FIG. 2. Here, the clock signal CLK may be a signal for designating the time at which the impulse signal is to be emitted, i.e. the starting time point (Time Start), and in some cases can be received from the outside. In compositions that are configured to receive the clock signal CLK from the outside, it would be possible to omit the clock signal generator unit 110.

The impulse generator unit 120 may generate an impulse signal in response to the clock signal CLK. The impulse generator unit 120 can, for example, first generate the impulse signal as a digital signal and then convert the generated digital signal into an analog signal. As illustrated in FIG. 2, the impulse generator unit 120 may transfer the impulse signal, which was generated in response to the rising edge of the clock signal CLK, to the signal emitter unit 130.

The signal emitter unit 130 can be implemented as a structure such as an antenna, etc., that is capable of emitting the impulse signal generated at the impulse generator unit 120. The antenna used for the signal emitter unit 130 is not limited to any type and can be implemented as a directional or non-directional antenna.

The delay signal detector unit 200 can include a signal receiver unit 210, a DTC generator unit 220, a template generator unit 230, a coarse time determiner unit 240, a fine time measurer unit 250, an I/Q modulator unit 260, and a distance calculator unit 270.

The signal receiver unit 210 may receive the delayed signal DS that is received after the impulse signal emitted from the impulse transmitter unit 100 is reflected off an object. The signal receiver unit 210 can be implemented with an antenna, similarly to the signal emitter unit 130. Although the signal emitter unit 130 and the signal receiver unit 210 are illustrated as separate units here for the sake of easier description, the signal emitter unit 130 and the signal receiver unit 210 can also be implemented as an integrated antenna that transmits and receives signals. That is, the signal emitter unit 130 and the signal receiver unit 210 can be integrated as an antenna unit.

The DTC generator unit 220 may receive the clock signal CLK from the clock signal generator unit 110 and may generate DTC signals in response to DTC codes received from the outside. As illustrated in FIG. 2, the DTC generator unit 220 may generate DTC signals that have rising edges (or falling edges) delayed by a duration corresponding to the DTC codes from the starting time point (Time Start) expressed by the rising edge (or falling edge) of the clock signal CLK. Here, the DTC generator unit 220 can generate the DTC signals by delaying the clock signal CLK according to the values of the DTC codes in units of a pre-designated time interval $\Delta\tau$. In this embodiment, the time interval $\Delta\tau$ can be set as an interval in which a pre-designated number of template signals can be arranged consecutively. Therefore, the time interval $\Delta\tau$ can be set as $\tau''*c$ according to the period τ" of the one template signal and the number of template signals c that are to be arranged within the time interval Δτ.

Here, it is supposed, as an example, that the time interval Δτ is set as an interval which allows a consecutive arranging of two template signals Tem1, Tem2, as illustrated in FIG. 4.

Although the descriptions above refer to the DTC signals being generated in response to DTC codes received from the outside, it is also possible to generate the DTC signals repeatedly in units of the pre-designated time interval Δτ from the starting point (Time Start) at which the rising edge of the clock signal CLK is generated.

The template generator unit 230 may generate a pre-designated number of template signals in response to the DTC signal generated at the DTC generator unit 220. Since, as described above, the time interval Δτ is set as an interval that allows a consecutive placing of two template signals Tem1, Tem2 in this example, the template generator unit 230 may generate two template signals Tem1, Tem2 consecutively.

FIG. 5 shows an existing composition for generating template signals, where a clock timing edge combiner and a push-pull pulse generator are included.

Referring to FIG. 5, the clock timing edge combiner may include a multiple number of serially connected inverters and may extract adjacent outputs from among the outputs of the multiple inverters, apply an inverse and a logical conjunction, extract the multiple sets of logical conjunction results in a pre-designated pattern, apply a logical disjunction and output the results. Here, the logical disjunction can be configured to apply a logical disjunction to the values at the two ends from among the multiple sets of logical conjunction results and sequentially apply a logical disjunction to the inner values for outputting, as illustrated in FIG. 5. The results of the logical disjunctions may be inverted alternately and outputted.

The push-pull pulse generator may include a multiple number of transistors that are arranged between either a power line $V_{DD}$ or a ground line GND and an output line $TX_{OUT}$. From among the multiple transistors, the PMOS transistors $M_{P1}$, $M_{P2}$ arranged between the power line $V_{DD}$ and the output line $TX_{OUT}$ may receive the results of the logical disjunction from the clock timing edge combiner as gates and may pull up the output line $TX_{OUT}$ to the power voltage level. Also, the NMOS transistors $M_{N1}$, $M_{N2}$ arranged between the ground line GND and the output line $TX_{OUT}$ may receive the results of the logical disjunction and inversion from the clock timing edge combiner as gates and may pull down the output line $TX_{OUT}$ to the ground voltage level. The push-pull pulse generator may be equipped with a buffer that includes PMOS transistors and NMOS transistors, which may be arranged between the power line $V_{DD}$ and the ground line GND, respectively, and an output line $TX_{OUT}$ and which may each have a gate connected to the output line $TX_{OUT}$, to stabilize the voltage level of the output line $TX_{OUT}$, while the capacitor $C_{ext}$ may charge or discharge according to the signal outputted from the buffer to output the impulse signal of an analog waveform.

FIG. 6 shows a composition for generating template signals according to an embodiment of the disclosure, where, for the sake of easier description, only the components corresponding to the components of the clock timing edge combiner in FIG. 5 are illustrated. Comparing the composition of FIG. 6 with that of FIG. 5, in this embodiment, the clock timing edge combiner may include multiple serially connected inverters of which the number is twice that of the inverters in FIG. 5. From among the outputs of the multiple inverters, adjacent outputs may be extracted and subjected to an inversion and a logical conjunction. This is because, in this embodiment, it is supposed that two template signals Tem1, Tem2 are generated consecutively, as described above. If the number of template signals generated consecutively is to be increased, a greater number of inverters can be included in correspondence to the increased number of template signals.

Afterwards, the composition may extract the multiple sets of logical conjunction results in a pre-designated pattern, apply a logical disjunction, and output the results, similarly to the composition of FIG. 5. Here, the logical disjunction can be configured to apply a logical disjunction to the values at the two ends for a corresponding number of logical conjunction results from among the multiple sets of logical conjunction results increased twofold, as illustrated by the dotted line in FIG. 6, and sequentially apply a logical disjunction to the inner values for outputting as illustrated in FIG. 5. The results of the logical disjunctions may be inverted alternately and outputted. That is, the remaining components can be configured such that the components of FIG. 5 are repeated twice with respect to the dotted line of FIG. 6.

The two template signals can be generated and outputted consecutively by the inverters serially connected in a number twice that of the inverters in FIG. 5.

However, the template generator unit 230 can also generate the multiple template signals by receiving an impulse signal generated at the impulse generator unit 120, duplicating or dividing the received impulse signal, and delaying the signals by different times in response to the DTC signals.

Referring again to FIG. 3, the coarse time determiner unit 240 may obtain the delayed signal DS from the signal receiver unit 210, obtain the two template signals Tem1, Tem2 generated consecutively at the template generator unit 230, and correlate the delayed signal DS with the two template signals Tem1, Tem2 to determine the time segment in which the delayed signal DS was received. That is, as shown in the graph marked "Coarse" in FIG. 4, the coarse time determiner unit 240 may determine the time segment in which the delayed signal DS was received by detecting the time segment for which the correlation results between the delayed signal DS and the two template signals Tem1, Tem2 are greater than or equal to a threshold value from among the multiple time segments divided in units of a pre-designated time interval Δτ. Although a segment in which the delayed signal DS was not received should basically yield correlation results of 0 for the template signals Tem1, Tem2, there can be occasions in which the correlation results actually yielded are greater than 0 because of noise, etc. Thus, in order to prevent erroneous detections of time segments due to noise, it may be preferable to set a threshold value and detect the time segment having correlation results that are greater than or equal to the threshold value.

In FIG. 4, it can be seen that the N-th time period (Period #N) is the period in which the delayed signal DS was received and detected.

That is, the coarse time determiner unit 240 can detect only the time segment in which the delayed signal DS was received and can thus coarsely determine the position of the object.

The fine time measurer unit 250 may calculate the correlations between the two template signals Tem1, Tem2 generated at the template generator unit 230 and the delayed signal DS, analyze the degree of overlap of the delayed signal DS for each of the two template signals Tem1, Tem2, and obtain the relative duration information of the delayed signal DS with respect to the two template signals Tem1, Tem2 within the time segment detected at the coarse time determiner unit 240, to obtain accurate position information of the object.

In FIG. 4, Fine1 and Fine2 represent the time segment detected at the coarse time determiner unit 240 (i.e. Period #N) divided into segments where the two template signals Tem1, Tem2 are generated, respectively, and FIG. 7 shows the results of correlation with a template signal according to the time at which the delayed signal DS is received. As illustrated in FIG. 7, if the delayed signal DS is received at the different time points of A, B, and C, the correlation results for the template signal may be calculated as different values, where a greater area of overlap between the delayed signal DS and the template signal, i.e. a smaller time difference between the delayed signal DS and the template signal, would provide a greater correlation result value. Therefore, it is possible to calculate the time difference between the delayed signal DS and the template signal based on the correlation result value.

In order to accurately calculate the time differences between the delayed signal DS and the template signals, the correlation results yielded from the relative position differences between the delayed signal DS and the template signals should all be different. However, there may be occurrences where, due to the signal waveform of the delayed signal DS and template signals, the correlation results yielded from the relative position differences are the same.

In FIG. 8, drawing (a) shows changes in the overlapped area according to changes in the received timing of the delayed signal DS for a template signal generated at a fixed time, and drawing (b) shows the correlation results according to changes in the received timing of the delayed signal DS.

Looking at drawing (b) of FIG. 8, the correlation results according to changes in the received timing of the delayed signal DS for a template signal can be calculated to the same value at several positions. As such, even after calculating the correlation between the delayed signal DS and a template signal, there are often cases in which the time difference between the delayed signal DS and the template signal cannot be determined.

Thus, a distance measuring apparatus according to this embodiment may further include an I/Q modulator unit 260, where the I/Q modulator unit 260 may apply I/Q modulation to a template signal generated at the template generator unit 230 to divide the signal into an I template signal and a Q template signal before transferring these signals to the fine time measurer unit 250. As is known in the art, an I template signal and a Q template signal obtained by I/Q modulation are signals having the same waveform but with a phase difference of 90 degrees. Thus, calculating the correlations between the I template and Q template signal and the delayed signal DS may yield two correlation results, as illustrated in drawing (a) of FIG. 9. Therefore, the correlation results at a particular time point (in this case, step) may be obtained as I data, representing the correlation result between the I template signal and the delayed signal DS, and Q data, representing the correlation result between the Q template signal and the delayed signal.

As illustrated in drawing (b) of FIG. 9, if the I data and Q data for each time point are expressed in vector form, the IQ vector for each time point may have different coordinates, meaning that no two time points have both the same I data and the same Q data. That is, since the correlation results according to the relative position differences between the delayed signal DS and the template signals are derived differently for all cases, it is possible to accurately determine the time difference between a delayed signal DS and a template signal.

In this embodiment, in particular, the I/Q modulator unit 260 may obtain an I template signal and a Q template signal for each of the multiple (in this example, two) template signals Tem1, Tem2 generated at the template generator unit 230, and the fine time measurer unit 250 may calculate the correlation results between the I template signal and Q template signal and the delayed signal DS for each of the multiple (in this example, two) template signals Tem1, Tem2 within the time segment (Period #N) detected at the coarse time determiner unit 240, so that the accurate time at which the delayed signal DS was received can be detected within the detected time segment (Period #N) as well.

In FIG. 10, drawing (a) shows the two template signals Tem1, Tem2 within the time segment (Period #N) detected at the coarse time determiner unit 240, while drawings (b) and (c) show the IQ vector graphs for the two template signals Tem1, Tem2, respectively. In FIG. 10, the symbols +, ▲, and ● represent the center positions of the delayed signal according to the received time point. As illustrated in FIG. 10, in a distance measuring apparatus according to this embodiment, the fine time measurer unit 250 can obtain four correlation values according to the correlations of the I template signals and Q template signals of the two template signals Tem1, Tem2 with respect to one delayed signal DS, and these can be derived as values on the two IQ vector graphs shown in drawings (b) and (c). In this way, the time at which the delayed signal DS was received within the detected time segment (Period #N) can be accurately detected. As illustrated in drawing (a) of FIG. 10, in particular, the fine time measurer unit 250 of a distance measuring apparatus according to this embodiment can divide the times at each of the two template signals Tem1, Tem2 more finely into multiple (in this example, sixteen) time sub-segments in detecting the time at which the delayed signal DS was received. This would be equivalent to further dividing the detected time segment (Period #N) into 32 time sub-segments to detect the delayed signal DS, meaning that the time at which the delayed signal DS was received can be detected with a resolution 32 times greater than that of the existing distance measuring apparatus.

Also, since the coarse time determiner unit 240 has set the time segments to include two template signals Tem1, Tem2, it is possible to measure an object that is at a distance twice as great as is possible with the existing distance measuring apparatus. Thus, an object at a greater distance can be measured with a higher resolution without increasing the number of bits of the DTC codes.

Although the descriptions above refer to the I/Q modulator unit 260 and the fine time measurer unit 250 as separate components for the sake of easier description, it is possible to have the I/Q modulator unit 260 incorporated in the fine time measurer unit 250.

Figure 11:
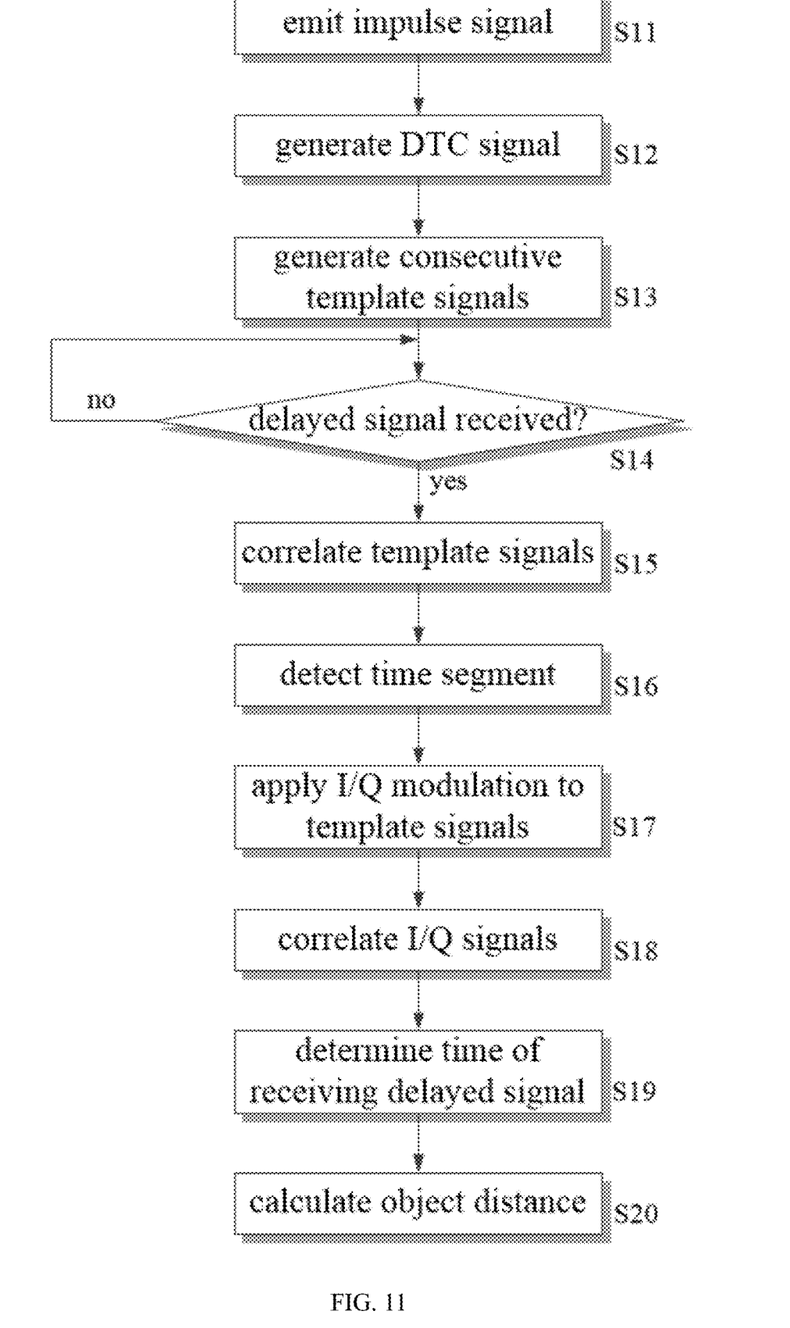
FIG. 11 illustrates a distance measuring method according to an embodiment of the disclosure.

FIG. 11 illustrates a distance measuring method according to an embodiment of the disclosure.

Describing the distance measuring method of FIG. 11 with reference to FIG. 1 to FIG. 10, an impulse signal of a pre-designated waveform may first be generated and emitted (S11). Here, the impulse signal can be emitted in response to a clock signal CLK that has a rising edge (or falling edge) generated at a pre-designated starting time point.

Then, DTC signals may be generated by delaying the clock signal CLK in units of a pre-designated time interval Δτ from the starting time point according to DTC codes (S12). Then, with respect to the rising edges of the generated DTC signals, a pre-designated number of template signals having the same waveform as the impulse signal emitted as the transmission signal Tx may be generated consecutively (S13). Here, the number of template signals generated consecutively may be designated beforehand, and the time interval Δτ may be set in correspondence to the number of template signals. The time interval Δτ can be set as a product of the period of a template signal and the number of template signals.

Then, it may be determined whether or not a delayed signal is received as the emitted impulse signal is reflected off an object and delayed (S14). If a delayed signal is received, the received delayed signal DS and the pre-designated number of template signals generated consecutively may be correlated (S15). The time segment in which the correlation results are greater than or equal to a pre-designated threshold value may be detected (S16). That is, the delay time after the impulse signal is emitted until the delayed signal is received may be coarsely detected in units of the time interval Δτ.

When the time segment in which the delayed signal DS is received is detected, I/Q modulation may be applied to each of the pre-designated number of template signals arranged consecutively in the detected time segment to obtain I template signals and Q template signals (S17). Then, the I template signals and Q template signals obtained from each of the pre-designated number of template signals may each be correlated with the delayed signal DS to obtain multiple pieces of I data and multiple pieces of Q data (S18). When the multiple pieces of I data and the multiple pieces of Q data are obtained, the time at which the delayed signal DS was received may be finely determined within the detected time segment by using the obtained multiple pieces of I data and multiple pieces of Q data (S19).

When the time segment is detected and the time at which the delayed signal DS was received within the time segment is determined, the distance to the object can be calculated and obtained from the detected time segment and the time at which the delayed signal DS was received within the time segment (S20).

A method based on the present disclosure can be implemented in the form of program instructions that may be performed using various computer means and can be recorded in a computer-readable medium. Here, such a computer-readable medium can be a temporary medium accessible by a computer and can include all types of computer storage media. A computer storage medium may include any type, either volatile or non-volatile, separable or non-separable, implemented by an arbitrary method or technology for storing information such as computer-readable instructions, data structures, program modules, and other data. Types of computer storage media can include ROM (read-only memory), RAM (random access memory), CD-ROM's, DVD-ROM's, magnetic tapes, floppy disks, optical data storage devices, etc.

While the disclosure is described with reference to certain embodiments illustrated in the drawings, such embodiments are merely provided as examples, and the person having ordinary skill in the art would understand that numerous variations and other equivalent embodiments can be derived from the above.

Therefore, the true scope of protection is to be defined by the technical spirit presented in the claims appended herein.

What is claimed is:

1. A distance measuring apparatus comprising:
a digital-to-time conversion (DTC) generator unit configured to generate DTC signals, the DTC signals having edges delayed to define time segments in units of a pre-designated time interval from a starting time point at which an impulse signal is emitted;
a template generator unit configured to generate template signals consecutively in a pre-designated number within the time segments in response to the DTC signals, the template signals having a same waveform as the impulse signal;
a coarse time determiner unit configured to determine a time segment in which a delayed signal is received by calculating correlations with the consecutively generated template signals, when the delayed signal is received after a delay as the emitted impulse signal is reflected off an object;
a fine time measurer unit configured to determine a time at which the delayed signal is received within the time segment determined at the coarse time determiner unit from results of calculating correlations between a plurality of template signals within the determined time segment and the delayed signal; and
a distance calculator unit configured to calculate a total delay duration of the delayed signal from the determined time segment and the time at which the delayed signal is received within the time segment and calculate a distance to a measurement target object from the calculated delay duration,
wherein the coarse time determiner unit calculates correlations between the plurality of template signals generated consecutively in each defined time segment and the delayed signal and determines a time segment for which the calculated correlation values are greater than or equal to a pre-designated threshold value,
wherein the fine time measurer unit determines the time at which the delayed signal is received by applying I/Q modulation to each of the plurality of template signals within the determined time segment to obtain a plurality of I template signals and a plurality of Q template signals and calculating correlations between the plurality of I template signals and the plurality of Q template signals and the delayed signal.

2. The distance measuring apparatus of claim 1, wherein the fine time measurer unit determines the correlations between the plurality of template signals and the delayed signal based on I/Q vectors formed as combinations of I data and Q data corresponding to each other from among a plurality of pieces of I data and a plurality of pieces of Q data and determines the time at which the delayed signal is received from the determined correlations, the plurality of pieces of I data obtained by calculating correlations between the plurality of I template signals and the delayed signal, the plurality of pieces of Q data obtained by calculating correlations between the plurality of Q template signals and the delayed signal.

3. The distance measuring apparatus of claim 2, wherein the fine time measurer unit divides the determined time segment into a plurality of time sub-segments and calculates the correlations between the plurality of I template signals and the plurality of Q template signals and the delayed signal at a level of each time sub-segment.

4. The distance measuring apparatus of claim 1, wherein the DTC generator unit defines the time segments in units of a time interval corresponding to a period of the template signal and a number of the template signals generated consecutively.

5. The distance measuring apparatus of claim 4, wherein the DTC generator unit generates DTC signals having edges delayed by durations corresponding to values of DTC codes received from outside in units of the time interval from the starting time point.

6. The distance measuring apparatus of claim 5, further comprising:
   an impulse transmitter unit configured to generate the impulse signal of a pre-designated waveform, the impulse transmitter unit configured to emit the generated impulse signal upon receiving a clock signal having an edge designating the starting time point.

7. A distance measuring method for a distance measuring apparatus, the distance measuring method comprising:
   generating digital-to-time conversion (DTC) signals, the DTC signals having edges delayed to define time segments in units of a pre-designated time interval from a starting time point at which an impulse signal is emitted;
   generating template signals consecutively in a pre-designated number within the time segments in response to the DTC signals, the template signals having a same waveform as the impulse signal;
   determining a time segment in which a delayed signal is received by calculating correlations with the consecutively generated template signals, when the delayed signal is received after a delay as the emitted impulse signal is reflected off an object;
   determining a time at which the delayed signal is received within the determined time segment from results of calculating correlations between a plurality of template signals within the determined time segment and the delayed signal; and
   calculating a total delay duration of the delayed signal from the determined time segment and the time at which the delayed signal is received within the time segment and calculating a distance to a measurement target object from the calculated delay duration,
   wherein the determining of the time segment comprises:
      calculating correlations between the plurality of template signals generated consecutively in each defined time segment and the delayed signal; and
      determining a time segment for which the calculated correlation values are greater than or equal to a pre-designated threshold value,
   wherein the determining of the received time comprises:
      obtaining a plurality of I template signals and a plurality of Q template signals by applying I/Q modulation to each of the plurality of template signals within the determined time segment; and
      calculating correlations between the plurality of I template signals and the plurality of Q template signals and the delayed signal to determine the time at which the delayed signal is received.

8. The distance measuring method of claim 7, wherein the calculating of the correlations comprises:
   obtaining I/Q vectors formed as combinations of I data and Q data corresponding to each other from among a plurality of pieces of I data and a plurality of pieces of Q data, the plurality of pieces of I data obtained by calculating correlations between the plurality of I template signals and the delayed signal, the plurality of pieces of Q data obtained by calculating correlations between the plurality of Q template signals and the delayed signal;
   determining the correlations between the plurality of template signals and the delayed signal based on the obtained I/Q vectors; and
   determining the time at which the delayed signal is received from the determined correlations.

9. The distance measuring method of claim 8, wherein the obtaining of the I/Q vectors comprises dividing the determined time segment into a plurality of time sub-segments and calculating the correlations between the plurality of I template signals and the plurality of Q template signals and the delayed signal at a level of each time sub-segment.

10. The distance measuring method of claim 7, wherein the generating of the DTC signals comprises defining the time segments in units of a time interval corresponding to a period of the template signal and a number of the template signals generated consecutively.

11. The distance measuring method of claim 10, wherein the generating of the DTC signals comprises generating DTC signals having edges delayed by durations corresponding to values of DTC codes received from outside in units of the time interval from the starting time point.

12. The distance measuring method of claim 11, further comprising, before generating the DTC signals, emitting the impulse signal,
   wherein the emitting of the impulse signal comprises:
      generating the impulse signal of a pre-designated waveform; and
      emitting the generated impulse signal when a clock signal having an edge designating the starting time point is received.

* * * * *